US007885931B2

(12) United States Patent
Seo et al.

(10) Patent No.: US 7,885,931 B2
(45) Date of Patent: Feb. 8, 2011

(54) APPARATUS AND METHOD FOR PROCESSING A DATA BACKUP SERVICE FOR USE IN A MOBILE TERMINAL

(75) Inventors: Jeong-Wook Seo, Daegu (KR); Wei-Jin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1835 days.

(21) Appl. No.: 10/926,097

(22) Filed: Aug. 26, 2004

(65) Prior Publication Data

US 2005/0050117 A1     Mar. 3, 2005

(30) Foreign Application Priority Data

Aug. 26, 2003   (KR)   ................... 10-2003-0059265

(51) Int. Cl.
    *G06F 17/30*      (2006.01)
(52) U.S. Cl. ................... 707/640; 707/652; 707/661
(58) Field of Classification Search ............. 707/10, 707/204, 102, 640
    See application file for complete search history.

(56) References Cited

U.S. PATENT DOCUMENTS

2002/0090068 A1* 7/2002 Song ................... 379/88.13
2003/0134625 A1* 7/2003 Choi ...................... 455/418

FOREIGN PATENT DOCUMENTS

EP         1 039 768 A2 *   9/2000
JP         2003-078636       3/2003
KR         1020020082058    10/2002

* cited by examiner

*Primary Examiner*—Etienne P LeRoux
*Assistant Examiner*—Monica M Pyo
(74) *Attorney, Agent, or Firm*—Roylance, Abrams, Berdo & Goodman, L.L.P.

(57) ABSTRACT

An apparatus and method for processing a data backup service of a mobile terminal. The apparatus and method backs-up data files stored in a mobile terminal in a backup server over a wireless Internet. The backup server is capable of backing-up resource information of the mobile terminal. The apparatus and method comprise a) checking setup backup resources during a backup setup procedure, and attempting to establish a connection to the backup server; b) analyzing category information of data to be transmitted to the backup server after connecting to the backup server, determining the number of references if the data category is equal to data including iterative information, and determining a division interval on the basis of a file size and performing data synchronization if the data category is equal to data including binary data. The apparatus and method further comprise c) separately storing the synchronization data serving as the iterative information and combining the separately-stored results when the synchronization data is determined to be iterative information, or divisionally storing the synchronization data, combining the divisionally-stored results, and transmitting the combined result when the synchronization data is determined to be divisionally-designated data; and d) terminating a backup operation of the mobile terminal when the backup server generates a response signal after the data is transmitted to the backup server.

6 Claims, 14 Drawing Sheets

FIG.6A

| HEADER | ANIMATION 1 | ANIMATION 2 | ..... | ANIMATION 3 |

FIG.6B

| type Avatar | numAni | Ani 1 | Ani 2 | ..... | Ani n |

FIG.6C

| ani ID | start Index | frame Cnt | int x | int y | int width | int height | byte name [Max_Avatar_Name_LEN] |

FIG.6F

| ani ID | start Index | frame Cnt | int x | int y | int width | int height | byte name [Max_Avatar_Name_LEN] |

FIG.6G

| ani ID | start Index | frame Cnt | int x | int y | int width | int height | byte name [Max_Avatar_Name_LEN] |

FIG.6H

| type | numAni | Ani 1 |

| ani ID | start Index | frame Cnt | int x | int y | int width | int height | byte name [Max_Item_Name_LEN] |
|---|---|---|---|---|---|---|---|
| | | 1 | 0 | 0 | | | |

FIG. 6I

| emotion | Cur Frame | max Frame | Cur Motion | Index |
|---|---|---|---|---|

FIG. 6J

APPARATUS AND METHOD FOR PROCESSING A DATA BACKUP SERVICE FOR USE IN A MOBILE TERMINAL

PRIORITY

This application claims the benefit under 35 U.S.C. 119(a) of an application entitled "METHOD FOR PROCESSING DATA BACKUP SERVICE FOR USE IN MOBILE TERMINAL", filed in the Korean Intellectual Property Office on Aug. 26, 2003 and assigned Serial No. 2003-59265, the entire contents of which are hereby incorporated by reference.

BACKGROUND OF THE INVENTION

1. Field of the Invention

The present invention relates to a backup service method for use in a mobile terminal. More particularly, the present invention relates to a data backup service for a mobile terminal having a character indication function.

2. Description of the Related Art

Most users prefer to use their avatars while using chat rooms, game sites, and communication sites, and so on over the Internet. Most Internet users (also known as netizens) previously had E-mail services and generally adapt their avatars as a new Internet identity tool. The reason why the avatars are becoming popular is due to Internet users having difficulty in fully expressing their unique characteristics during a common text-based PC communication service or an initial Internet service. Multimedia-associated technologies are also becoming popular.

Avatar technologies for meeting the needs of Internet users who desire to freely express their characteristics on the Internet have provided the Internet users with only traditional doll-like characters, such that new avatar-associated technology must be developed to enable the Internet users to more effectively use their avatars on the Internet. However, the current avatar service capable of providing individual Internet users with only a doll-like character service has little attraction for mobile phone users. Therefore, avatars for use in conventional Internet services, avatars for use in online games, and avatars for use in mobile phones must be distinguished from each other such that they must be developed in different ways. In conclusion, there is a need for a new avatar system for combining typical avatar functions with avatar characteristics, and interacting with mobile network devices, such that it can implement improved avatar functions other than the conventional doll-like characters and instruments.

As described above, a conventional phone function and a variety of additional functions are increasingly being added to the current mobile phones or terminals. Particularly, a new mobile phone (also called a mobile terminal) in which one of the additional functions interacts with operations of a specific mobile phone to implement an avatar function capable of displaying status information of the mobile phone is currently being studied by many developers. The new mobile terminal requires a backup function for characters and information on a variety of mobile terminals interacting with the characters. In this case, the character is indicative of all data processed in the form of an image file.

SUMMARY OF THE INVENTION

Therefore, the present invention has been made in view of the above problems, and it is an object of the present invention to provide an apparatus and method for performing a backup service for mobile terminal data using a character agent function in a mobile terminal having a character indication function.

It is another object of the present invention to provide an apparatus and method for backing-up data and characters of a mobile terminal in an external server over a wireless communication network during a predetermined time in the mobile phone having a character indication function.

It is yet another object of the present invention to provide an apparatus and method for backing-up characters in an external server over a wireless communication network in a mobile phone having a character indication function.

It is yet another object of the present invention to provide an apparatus and method for generating an avatar file in the form of a transmission file in a mobile terminal having an avatar indication function, and transmitting the transmission file to a backup server over a wireless communication network.

It is yet another object of the present invention to provide an apparatus and method for backup storing a variety of characters such as an avatar indicative of operational states of a mobile terminal and an avatar house displayed as a standby mode screen image and so on in an external server over a wireless communication network.

It is yet another object of the present invention to provide an apparatus and method for backup storing a variety of characters such as an avatar indicative of operational states of a mobile terminal, an avatar house displayed as a standby mode screen image, and items displayed in the avatar house in an external server over a wireless communication network.

In accordance with one aspect of the present invention, the above and other objects can be accomplished by the provision of an apparatus and method for backing-up data files stored in a mobile terminal in a backup server over a wireless Internet. The backup server is capable of backing-up resource information of the mobile terminal. The apparatus and method comprise a) checking setup backup resources during a backup setup procedure, and attempting to establish a connection to the backup server; b) analyzing category information of data to be transmitted to the backup server after connecting to the backup server, determining the number of references if the data category is equal to data including iterative information, and determining a division interval on the basis of a file size and performing data synchronization if the data category is equal to data including binary data. c) The apparatus and method further comprise separately storing the synchronization data serving as the iterative information and combining the separately-stored results when the synchronization data is determined to be iterative information, or divisionally storing the synchronization data, combining the divisionally-stored results, and transmitting the combined result when the synchronization data is determined to be divisionally-designated data; and d) terminating a backup operation of the mobile terminal when the backup server generates a response signal after the data is transmitted to the backup server.

In accordance with another aspect of the present invention, there is provided an apparatus and method for controlling a mobile terminal to backup-store an avatar in a backup server over a wireless Internet. The backup server capable of backing-up resource information of the mobile terminal including the avatar for performing an agent function by interacting with a terminal function. The apparatus and method comprise a) attempting to establish connection to the backup server upon receipt of a backup setup request; b) selecting an avatar to be backup-stored after being connected to the backup server; c) generating a character transmission file which comprises an avatar header including indication positions and size information of individual animations and a plurality of images of individual animations of the avatar after calculating a file size of the selected avatar; The apparatus and method further comprise d) transmitting the generated character transmission file to the backup server; and e) terminating a backup operation if the backup server generates a response signal after transmitting the character transmission file.

In accordance with yet another aspect of the present invention, there is provided an apparatus and method for controlling a mobile terminal to backup-store a character in a backup server over a wireless Internet. The backup server capable of backing-up resource information of the mobile terminal including the character for performing an agent function by interacting with a terminal function. The apparatus and method comprise a) attempting to establish a connection to the backup server upon receipt of a backup setup request; b) determining a category of a character to be backup-stored after being connected to the backup server; c) calculating a file size of the avatar, and generating a character transmission file which comprises an avatar header including indication positions and size information of individual animations and a plurality of images of individual animations of the avatar if the determined character is equal to an avatar. The apparatus and method further comprise d) calculating a file size of the avatar house, and generating a character transmission file which comprises an avatar house header including indication positions of characters each comprising a background image and items and a plurality of character images of the avatar house if the determined character is equal to an avatar house displayed in a standby mode; e) transmitting the generated character transmission file to the backup server; and f) terminating a backup operation if the backup server generates a response signal after transmitting the character transmission file.

In accordance with yet a further another aspect of the present invention, there is provided an apparatus and method for controlling a mobile terminal to backup-store a character in a backup server over a wireless Internet. The backup server capable of backing-up resource information of the mobile terminal including the character for performing an agent function by interacting with a terminal function. The apparatus and method comprise a) attempting to establish a connection to the backup server upon receipt of a backup setup request; b) determining a category of a character to be backup-stored after being connected to the backup server; c) calculating a file size of the avatar, and generating a character transmission file which comprises an avatar header including indication positions and size information of individual animations and a plurality of images of individual animations of the avatar if the determined character is equal to an avatar. The apparatus and method further comprise d) calculating a file size of the avatar house, and generating a character transmission file which comprises an avatar house header including indication positions of characters each comprising a background image and items and a plurality of character images of the avatar house if the determined character is equal to an avatar house displayed in a standby mode; e) calculating a file size of the item, and generating a character transmission file which comprise an item header including the item and an item indication position field and an item image if the determined character is indicative of an item not connected to the avatar house; f) transmitting the generated character transmission file to the backup server; and g) terminating a backup operation if the backup server generates a response signal after transmitting the character transmission file.

In accordance with yet a further another aspect of the present invention, there is provided an apparatus and method for controlling a mobile terminal to backup-store a character in a backup server over a wireless Internet. The backup server is capable of backing-up resource information of the mobile terminal including the character for performing an agent function by interacting with a terminal function. The apparatus and method comprise a) attempting to establish a connection to the backup server upon receipt of a backup setup request; b) determining a category of a character to be backup-stored after being connected to the backup server; c) calculating a file size of the avatar, and generating a character transmission file which comprise an avatar header including indication positions and size information of individual animations and a plurality of images of individual animations of the avatar if the determined character is equal to an avatar. The apparatus and method further comprise d) calculating a file size of the avatar house, and generating a character transmission file which comprises an avatar house header including indication positions of characters each comprising a background image and items and a plurality of character images of the avatar house if the determined character is equal to an avatar house displayed in a standby mode; e) calculating a file size of the item, and generating a character transmission file which is comprised of an item header including the item and an item indication position field and an item image if the determined character is indicative of an item not connected to the avatar house; f) calculating a file size of the index variable, and generating an index variable file, which comprises an emotion value of the avatar file, an animation frame displayed in response to a current emotion value, the number of frames, a category of a currently-displayed behavior, and a file index in the form of a character transmission file if the determined character is indicative of an index variable of the avatar file; g) transmitting the generated character transmission file to the backup server; and h) terminating a backup operation if the backup server generates a response signal after transmitting the character transmission file.

BRIEF DESCRIPTION OF THE DRAWINGS

The above and other objects, features and other advantages of the present invention will be more clearly understood from the following detailed description taken in conjunction with the accompanying drawings, in which:

FIGS. 6A through 6J are diagrams illustrating characteristic configurations in accordance with an embodiment of the present invention;

Throughout the drawings, it should be noted that the same or similar elements are denoted by like reference numerals.

DETAILED DESCRIPTION OF THE PREFERRED EMBODIMENTS

Figure 1:
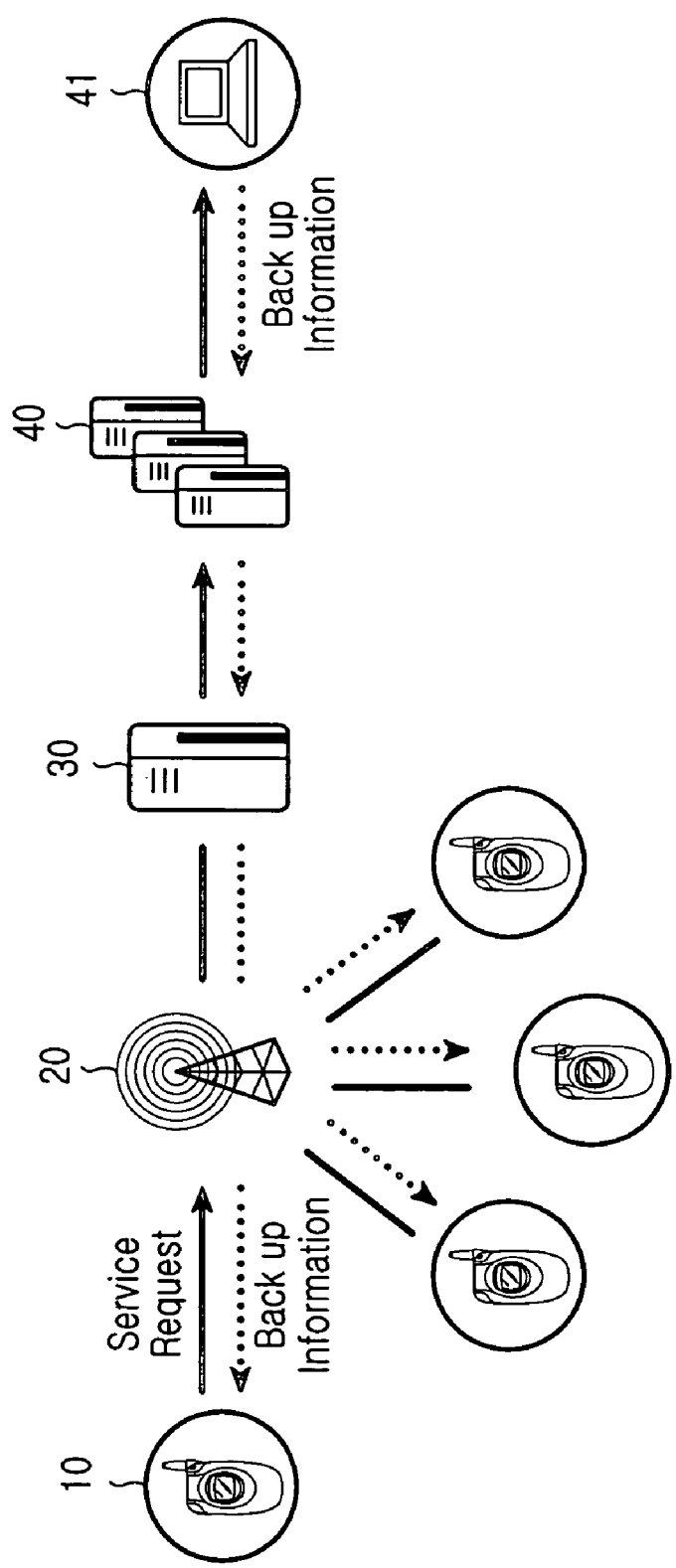
FIG. 1 is a schematic diagram illustrating a network for performing a backup service of data of a mobile terminal having an agent function in accordance with an embodiment of the present invention.

Several embodiments of the present invention will now be described in detail with reference to the accompanying drawings. In the following description, a detailed description of known functions and configurations incorporated herein will be omitted for conciseness.

In accordance with embodiments of the present invention, data stored in a mobile terminal is transmitted to and stored in a backup server. The data stored in the mobile terminal is classified into first, second and third data. The first data is indicative of iterative data such as address directory or E-mail data. The second data is indicative of data including binary data, for example, multimedia and character data, and so on. The third data is indicative of general data such as alarm or IM information, and so on.

The embodiments of the present invention will be disclosed on the basis of the character data instead of the data category. A character for the mobile terminal comprises an avatar, an avatar house, and items.

The avatar includes avatar animations for indicating a variety of emotional states, avatar animations for indicating a variety of emotions corresponding to contents of Short Message Service SMS messages of the mobile terminal, and other avatar animations for indicating a variety of events generated from the mobile terminal. For the convenience of description, in the embodiments of the present invention, it is assumed that five avatar animations for indicating emotional states of the mobile terminal, five avatar animations for indicating emotional states corresponding to the SMS message contents, and five animations corresponding to the events of the mobile terminal are used. The aforementioned avatar animations include corresponding headers, respectively. The avatar file may comprise a header and the animation images. Each header includes a variety of information for individual animations, for example, Identifiers (Ids), start positions, the number of images, display positions, and names, and so on. During an avatar backup transmission mode, headers corresponding to the avatar animations and the avatar animation images are configured in the form of a transmission file, and the transmission file is uploaded to the backup server 40.

The avatar house is indicative of a specific screen image in which one or more items are connected to an avatar house background image and the connected result is displayed in the form of a standby-mode image of the mobile terminal. The avatar house arranges user-selected items on the background image, such that it is adapted as a standby-mode image of the mobile terminal. In this case, the avatar may also be displayed in the avatar house. In this case, the file structure of the avatar house may comprise a header and animation images. The header comprises an avatar house header and headers of items connected to the avatar houses. The avatar house header includes an avatar house ID, an avatar display position, an avatar house size, an avatar house name, and so on. The item header includes an item index, an avatar house position at which the item is to be displayed, and item names. During the avatar house backup transmission mode, the avatar house, and headers corresponding to items connected to the avatar house, a background image of the avatar house, and item images are each configured in the form of a compression file, and the compression file is uploaded to the backup server 40.

The items are indicative of character images capable of being displayed on the avatar house image. The items are connected to the avatar house such that they can be displayed on the avatar house image. If the items are not connected to the avatar house, they are not displayed on the avatar house image. Therefore, avatar images not connected to the avatar house must be separately transmitted during the avatar backup transmission. The items comprise data in which a header and an animation image are compressed. The header may comprise an item index, an avatar house position at which the item is to be displayed, and names. In this case, the display position information of the item may be equal to position information determined to be default data when the item is not connected to the avatar house.

It is assumed that the aforementioned image data compression scheme extracts only specific data from a typical compression result in which the Lempel-Ziv scheme and the Huffman encoding scheme are combined, such that the extracted data can be used in the aforementioned image data compression scheme.

FIG. 1 is a schematic diagram illustrating a network for performing a backup service of a mobile terminal having a character display function in accordance with an embodiment of the present invention.

Referring to FIG. 1, the mobile phone 10 is indicative of a mobile phone having a character display function, and can transmit and receive characters from one mobile phone to other mobile phones. The mobile phone 10 generates a service request for storing internal resources in the backup server 40 upon receipt of a user's request, or generates such a service request during a predetermined period. In this case, the resources of the mobile phone 10 may comprise a phone number, an SMS message, a schedule, and a variety of contents information such as image data, audio data, games, and characters, and so on. The wireless communication network 20 transmits backup information from the mobile phone 10 to the Internet server 30. In this case, the wireless communication network 20 may be indicative of a communication wireless communication network comprising a Base Station Transceiver (BTS), a Base Station Controller (BSC), and an Mobile Switching Center (MSC), and so on. Thereafter, the Internet server 30 transmits received backup information from the mobile phone 10 to the backup server 40. The backup server 40 stores the backup information of the mobile phone 10 in a corresponding area, and transmits a response message to a corresponding mobile phone 10. The response message is transmitted to the mobile phone 10 via the Internet server 30 and the wireless communication network 20.

Figure 2:
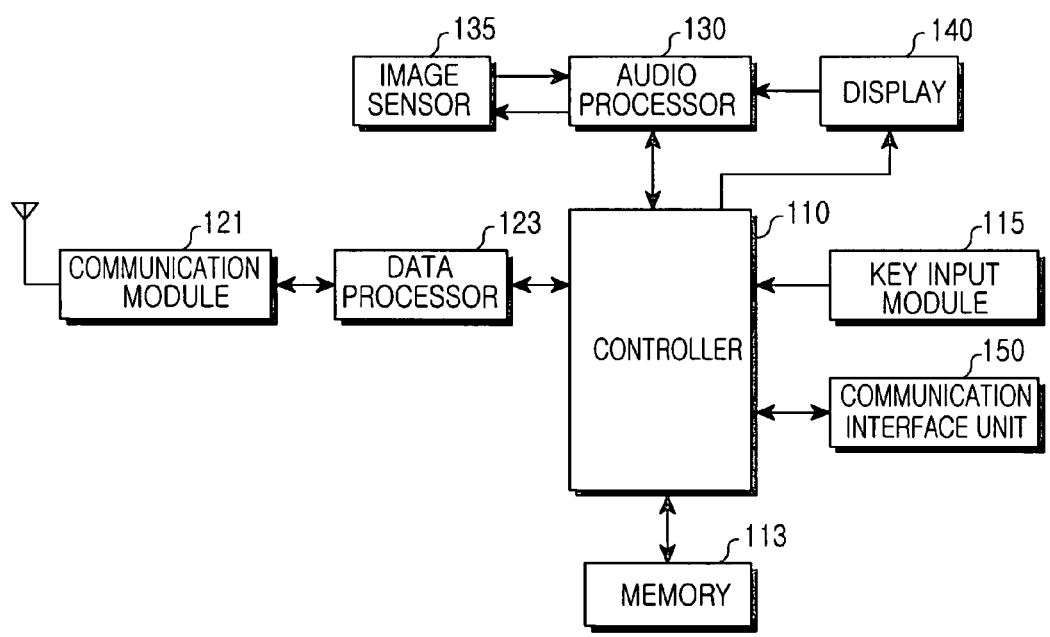
FIG. 2 is a block diagram illustrating a mobile terminal having an agent function.

FIG. 2 is a detailed block diagram illustrating the mobile phone 10 of FIG. 1.

Referring to FIG. 2, the communication module 121 performs wireless communication between the mobile phone and the wireless communication network 20. The communication module 121 includes an Radio Frequency (RF) transmitter for up-converting a frequency of a transmission signal, and amplifying the resultant signal; and an RF receiver for low-noise-amplifying a received signal, and down-converting a frequency of the low-noise-amplified signal, and so on. The data processor 123 includes a transmitter for encoding and modulating the transmission signal, and a receiver for demodulating and decoding the received signal. Specifically, the data processor 123 may comprise a MODEM and a CODEC. In this case, the CODEC may include a data codec for processing data and an audio codec for processing audio signals such as voice signals.

The key entry unit 115 includes a plurality of keys for entering number and character information and a plurality of function keys for establishing a variety of functions. The key entry unit 115 includes other function keys for activating a character communication function and a backup service function in accordance with an embodiment of the present invention.

The memory 113 may comprise a program memory and a plurality of data memories. The program memory stores a variety of programs of the mobile phone, such as programs for performing character communication between one or more mobile phones, and programs for performing a backup process of backup information of the mobile phone. The data memory temporarily stores data generated during execution times of the programs. The data memory includes a character memory for displaying character animation information corresponding to individual events in accordance with an embodiment of the present invention. The character memory may operate as a file system, and may have memory indexes such as a file system for every character. The character memory may comprise a variety of formats of detailed components of individual avatars, for example, operations, expressions, and representations of various avatars. Specifically, the character information stored in the character memory may be stored while being classified according to individual formats capable of performing a variety of character reactions. The inventive character may include an avatar, an avatar house, and items.

The controller 110 controls overall operations of the mobile phone. The controller may include the data processor 123. The controller 110 for use in the mobile phone may be an MSM chip including the data processor 120. The controller 110 can indicate a variety of states of the mobile phone using avatar information in accordance with an embodiment of the present invention. A microphone and a speaker for performing the communication function may be connected to the data processor 123 and the controller 110.

The image sensor 135 converts a captured optical signal into an electrical image signal, and converts the image signal into digital data. In this case, the image sensor may include a Charge Coupled Device (CCD) or Complementary Metal Oxide Semiconductor (CMOS) sensor, and a signal processor.

The image processor 130 processes the image signal generated from the image sensor 135. The image processor 130 processes the image signal received from the image sensor 135 in frame units, and outputs the frame image data according to characteristic and magnitude information of the display 140. The image processor 130 includes a video codec, compresses frame image data displayed on the display 140 according to a predetermined method, and recovers the original frame image data from the compressed frame image data. In this case, the image processor 130 processes multimedia data.

The display 140 displays image data processed by the image processor 130 on its screen, and displays user data generated from the controller 110. The display 140 may be a Liquid Crystal Display (LCD). In this case, the display 140 may include an LCD controller, a memory for storing image data, and an LCD panel, and so on. If the LCD is implemented with a touch-screen LCD, it may also function as an entry unit.

The communication interface unit 150 is connected to an external communication device such that it can communicate with the mobile phone. In this case, the external communication device may be indicative of another mobile phone, a computer, a digital camera, and so on. The communication interface unit 150 performs a communication interface function with the external communication devices upon receiving a control signal from the controller 110, and transmits and receives stored resources of the mobile phone to/from the external devices. The communication interface unit 150 may be implemented with a wireless communication scheme such as InfraRed Data Association (IrDA) or Bluetooth communication and a wired communication scheme such as an RS-232C.

The aforementioned mobile phone performs character communication with other mobile phones.

Referring to the character communication procedure, users of the mobile phones can easily access their desired contents using a WINC or hot key scheme due to the widespread wireless Internet. The mobile phone having a character indication function can perform character communication over the wireless Internet using a phone-to-phone scheme without using any service of a wireless communication enterprise. The mobile phone having the character function can directly communicate with other mobile phones via the communication interface unit 150. The character may be communicated between mobile phones using only an Enhanced Messaging Service (EMS) suitable for character image transmission from among five message functions such as SMS, EMS, MMS, E-mail, and Fax functions of the Symbian Operating System (OS).

The character of the mobile phone performs a backup service function. As can be seen from the service named "backup function", the backup function wirelessly transmits a variety of resources (e.g., phone numbers, SMS messages, schedules, and contents of downloaded pictures, ringtones, games, and music) significantly used in a corresponding phone such as Symbian or Normal Real Time Operating System (RTOS) phone to the backup server 40, and performs a backup function in the backup server 40.

The character backup service will now be described in detail.

Firstly, the character backup service is performed by an agent function of the character. Secondly, the character backup service may be performed by either an automatic backup method automatically performed for a specific period, during which the user does not use the mobile phone, contained in a predetermined period, or a manual backup method performed at a user's desired time interval such as once a week, or once a month, and so on. Thirdly, the server 40 for backing-up resources of the mobile phone operates in the wireless Internet as shown in FIG. 1. The mobile phone may generate a backup service request, or may generate a backup service via a PC41. Fourthly, an initial settlement device is required when connecting the mobile phone to the backup server 40 such as when a desired game is downloaded. The settlement device may be considered to be a process for acquiring a safe key. The character can acquire a new item such as a backup using the settlement device. The backup service process in accordance with an embodiment of the present invention must be stored in the backup server, and must store specific information indicative of settlement completion. Fifthly, a differentiation point of the inventive backup service must include a character for performing a restoring service. Specifically, if the user's mobile phone is initialized, or if the user's mobile phone is replaced with another mobile phone, a mobile phone capable of supporting the inventive service can be restored to the conditions existing at the time of the last backup.

The resources for the aforementioned character backup service have the following data formats shown in Table 1 through Table 8.

Referring to the data formats, the data format has a variable size, and is equal to a structure including a plurality of fields having unfixed sizes. The data format supported from the data structure is indicative of 1-byte integer such as 8-bits integer of 1 byte, 2-bytes integer such as 16-bits integer of 2 bytes stored using the little-endian scheme, 4-bytes integer such as 32-bits integer of 4 bytes stored using the little-endian scheme, a string such as a byte-type array whose end is a specific value '0', and binary data, and so on. The configuration of the data formats is equal to a predetermined array comprising the four formats described in the aforementioned description, and a string of each size of individual integers stores even '0' indicating an end.

The data category stored as synchronization (Sync) data is positioned in individual first fields of the following Tables 1 through 8. The data category defines the eight categories as shown in the following Tables 1 through 8.

TABLE 1

| Field | Data format |
| --- | --- |
| Data category | 8-bits integer (value 1) |
| Name | String |
| Mobile phone No. | String |
| E-mail address | String |
| Homepage address | String |
| Messenger address | String |
| Nickname | String |
| Birthday - year | 16-bits integer |
| Birthday - month | 8-bits integer |
| Birthday - day | 8-bits integer |
| Home phone No. | String |
| Office phone No. | String |
| Home-postal code No. | String |
| Home-city/do | String |
| Home-Gu/Gun/city | String |
| Home-remaining address | String |
| Home-country | String |
| Office name | String |
| Office-postal code No. | String |
| Office-city/do | String |
| Office-country | String |
| Office-Gu/Gun/City | String |
| Office-remaining address | String |

TABLE 2

| Field | Data format |
| --- | --- |
| Data category | 8-bits integer (value 2) |
| Transmission No. | String |
| Reception No. | String |
| Reception date-year | 16-bits integer |
| Reception date-month | 8-bits integer |
| Reception date-day | 8-bits integer |
| Reception time-hour | 8-bits integer |
| Reception time-minute | 8-bits integer |
| Reception time-second | 8-bits integer |
| Importance level | 8-bits integer |
| Contents | String |

TABLE 3

| Field | Data format |
| --- | --- |
| Data category | 8-bits integer (value 3) |
| One's post-office-box ID | 8-bits integer |
| UID | String |
| Reception date-year | 16-bits integer |
| Reception date-month | 8-bits integer |
| Reception date-day | 8-bits integer |
| Reception time-hour | 8-bits integer |

TABLE 3-continued

| Field | Data format |
| --- | --- |
| Reception time-minute | 8-bits integer |
| Reception time-second | 8-bits integer |
| Sender's name | String |
| Sender's address | String |
| Number of senders (N1) | 8-bits integer |
| Number of Tos (N2) | 8-bits integer |
| Number of CCs (N3) | 8-bits integer |
| Receiver name 1 | String |
| Receiver name address 1 | String |
| . . . | |
| Receiver name N1 | String |
| Receiver address N1 | String |
| Title | String |
| Body | String |
| Attachment number(N) | 8-bits integer |
| Attachment name 1 | String |
| Attachment size 1 | 32-bits integer |
| Attachment data 1 | Binary data |
| . . . | |
| Attachment name N | String |
| Attachment size N | 32-bits integer |
| Attachment data N | Binary data |

TABLE 4

| Field | Data format |
| --- | --- |
| Data category | 8-bits integer (value 4) |
| Picture file name | String |
| File date-year | 16-bits integer |
| File date-month | 8-bits integer |
| File date-day | 8-bits integer |
| File time-hour | 8-bits integer |
| File time-minute | 8-bits integer |
| File time-second | 8-bits integer |
| File size | 32-bits integer |
| File data | Binary data |

TABLE 5

| Field | Data format |
| --- | --- |
| Data category | 8-bits integer (value 5) |
| File name | String |
| File date-year | 16-bits integer |
| File date-month | 8-bits integer |
| File date-day | 8-bits integer |
| File time-hour | 8-bits integer |
| File time-minute | 8-bits integer |
| File time-second | 8-bits integer |
| File size | 32-bits integer |
| File data | Binary data |

TABLE 6

| Field | Data format |
| --- | --- |
| Data category | 8-bits integer (value 6) |
| Alarm category (morning-call, and general alarm, etc.) | 8-bits integer |
| alarm option (once, weekend, and everyday) | 8-bits integer |
| alarm sound name | String |
| alarm hour-hour | 8-bits integer |
| alarm hour-minute | 8-bits integer |

TABLE 7

| Field | Data format |
| --- | --- |
| Avatar data category | 8-bits integer |
| Number of animations | 32-bits integer |
| The following information is repeated N times | |
| Animation X-axis | 8-bits integer |
| Animation Y-axis | 8-bits integer |
| Animation horizontal length | 8-bits integer |
| Animation vertical length | 8-bits integer |
| Animation data size | 16-bits integer |
| Number of animation frames | 16-bits integer |
| Animation ID | 32-bits integer |
| Animation start index | 32-bits integer |
| Animation name | String |
| The following information is repeated N times | |
| Frame start offset | 32-bits integer |
| Frame data size | 32-bits integer |
| Frame data | String |

TABLE 8

| Field | Data format |
| --- | --- |
| Data category | 8-bits integer (value 8) |
| ID | String |
| Dialogue name | String |
| One's group | String |
| Address directory ID | 32-bits integer |

The data structures such as Tables 1 through 8 are equal to contents stored in the data memory contained in the memory 113 of FIG. 2. As can be seen from Tables 1 through 8, "1" contained in the data category is data indicative of phone number resources. The phone number resources may include a user name, a mobile phone number, an E-mail address, a homepage address, a message address, a nickname, a birthday, a home phone No., an office phone No., a home address, an office name, and an office address, and so on.

"2" contained in the data category is data indicative of SMS resources, and stores a caller No., a receiver No., a reception day, an importance, and SMS contents.

"3" contained in the data category is data indicative of E-mail resources, and includes a post-office-box ID, user identifier (UID), a reception date, a caller name, a caller address, the number of receivers, the number of TOs, the number of CCs, names of receivers, addresses of the receivers, a title, body contents, an attachment number, an attachment name, an attachment size, and attachment data.

"4" contained in the data category is data indicative of image resources, and includes a picture file name, a file reception date, a file size, and image file data.

"5" contained in the data category is data indicative of multimedia resources, and includes a file name, a file reception date, a file size, and file data. In this case, the multimedia resources may be equal to a moving image file or a music file, and so on.

"6" contained in the data category is data indicative of alarm information resources, and includes an alarm category, an alarm option, alarm sound, and an alarm time, and so on.

"7" contained in the data category is data indicative of character resources.

"8" contained in the data category is data indicative of IM information, and includes ID, dialogue name, one's group, and address directory ID, and so on.

The mobile phone including the aforementioned data categories shown in Tables 1 through 8 includes a character. The character performs an agent function by interacting with functions of the mobile phone, and backs-up data of the mobile phone simultaneously with performing the agent function. In this case, the agent function is indicative of a spam mail and message filtering function, a scheduling function, a helper function for activating various menus, and a function for supporting an additional function, and so on.

Figure 3:
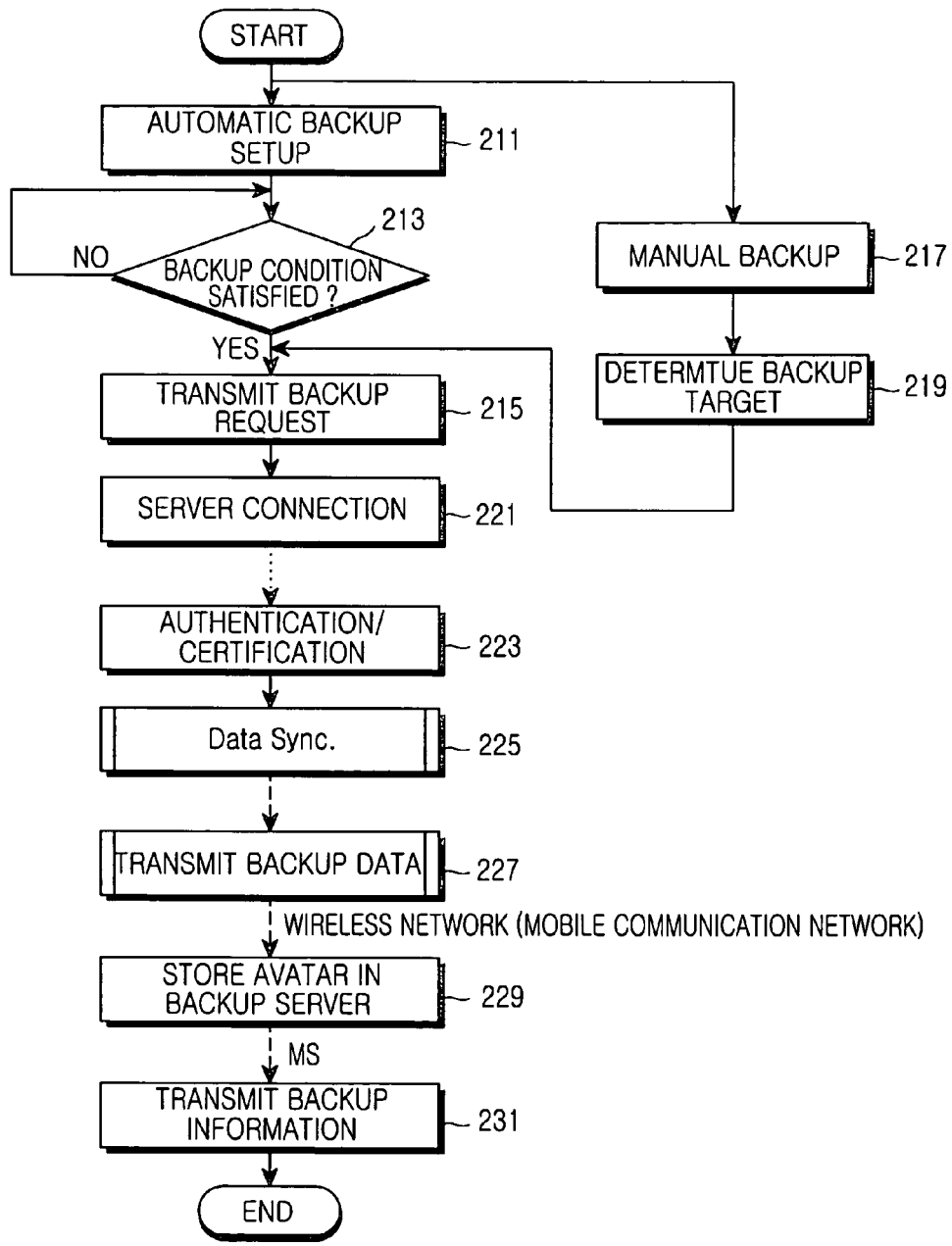
FIG. 3 is a flow chart illustrating a procedure for performing a backup function in a mobile terminal in accordance with an embodiment of the present invention.

FIG. 3 is a flow chart illustrating a procedure for performing a backup function in the mobile phone in accordance with an embodiment of the present invention.

Referring to FIG. 3, if an automatic backup function is established or a manual backup command is generated from a user, the backup service of the mobile phone is performed using the procedures of FIG. 3. In this case, if the automatic backup function has been established, the controller 110 of the mobile phone detects the automatic backup setup at a predetermined time at step 211, and determines a backup condition at step 213. If the backup condition has been satisfied, the controller 110 transmits a backup request of the mobile phone at step 215. During the automatic backup setup mode, the user pre-establishes and stores a backup time and backup target data. If a user requests a manual backup mode, the controller 110 detects the manual backup mode at step 217. Upon receipt of user-defined backup data, the backup target is determined according to the received information at step 219.

If the automatic backup or manual backup mode has been set, the controller 110 confirms backup targets, generates a backup service request message, outputs the backup service request via the communication module 121, and attempts to access the backup server 40 at step 221. If the controller gains access to the backup server 40, the controller 110 of the mobile phone performs an authentication/certification procedure in association with the backup server 40 at step 223. In this case, the authentication/certification procedure is equal to a conventional authentication/certification procedure performed on the Internet.

Thereafter, the controller 110 performs data synchronization of the determined data category at step 225. The data synchronization is performed using the procedures of FIG. 4.

Figure 4:
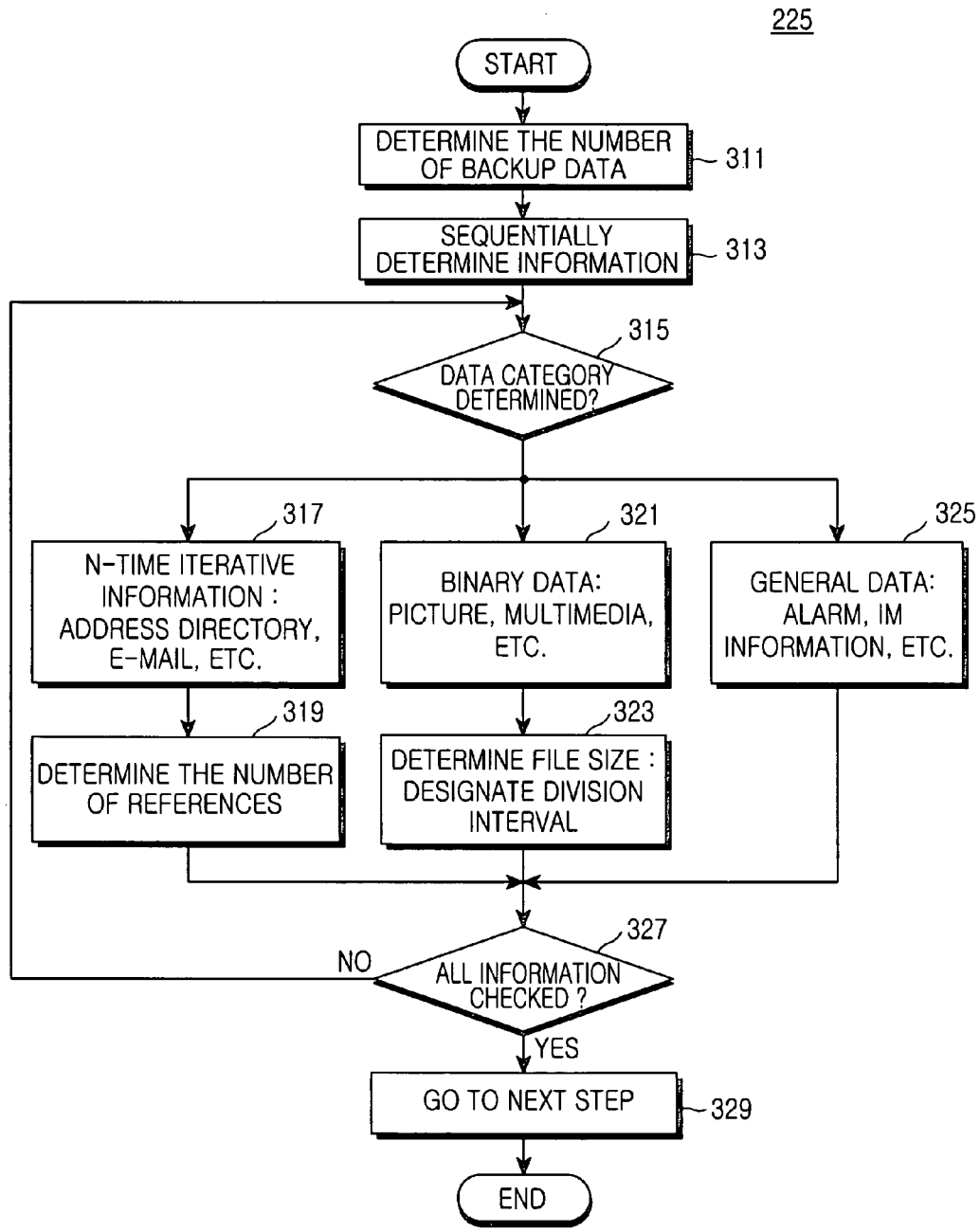
FIG. 4 is a flow chart illustrating a data synchronization procedure of FIG. 3.

Referring now to FIG. 4, the controller 110 checks the number of backup data units according to the determined backup data at step 311, and sequentially checks backup information at step 313. The controller 110 checks all the categories of the determined backup data in such a way that it can check all the backup information at steps 315 through 327. In this case, the data category may be equal to data categories shown in Tables 1 through 8. The data category is checked at step 315. If the data category is equal to data of information repeated N times, for example, phone number information and E-mail data, and so on at step 315, the N-times iterative data is detected at step 317, and the number of references of corresponding data is checked at step 319. If the data category is equal to binary data, for example, picture, multimedia, and compressed character data, and so on, the controller 110 detects the binary data at step 321, determines a file size, and determines a division interval at step 323. If the data category is equal to general data such as alarm or IM information, the controller 110 detects the general data at step 325. If all the information of the determined data categories are checked, the controller 110 confirms the data category information at step 327, terminates a synchronization process depending on the determined data category, and goes to the next step at step 329.

Referring now to FIG. 3, if the data synchronization for the backup service is finished using the procedures of FIG. 4, the controller 110 transmits the confirmed backup data at step 227. The backup data transmission is performed using the procedures of FIG. 5.

Figure 5:
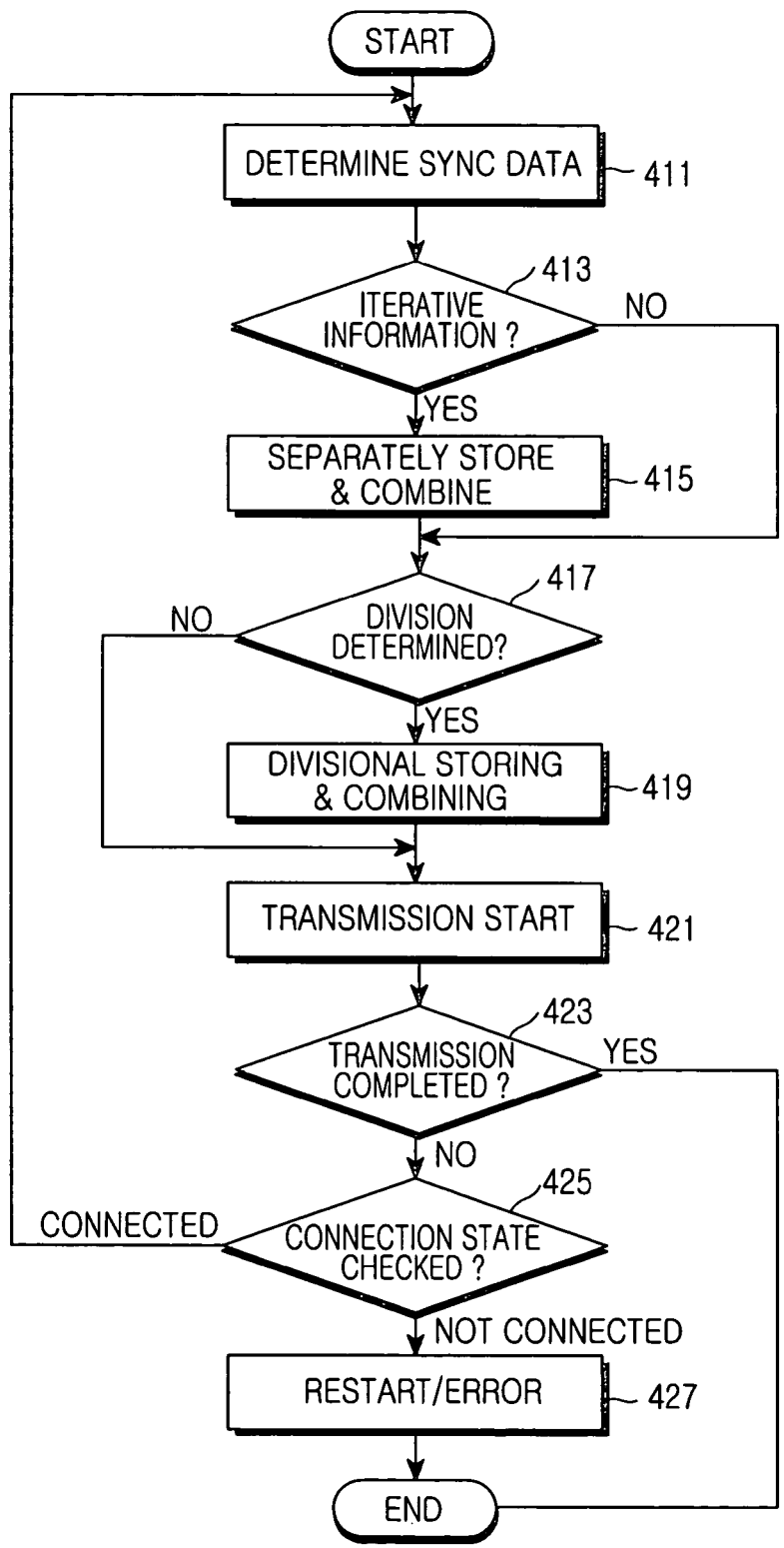
FIG. 5 is a flow chart illustrating a backup data transmission procedure of FIG. 3.

Referring now to FIG. 5, the controller 110 checks synchronization data of backup transmission to be transmitted at step 411, and determines whether the checked data is iterative data such as phone or E-mail data at step 413. In this case, if it is determined that the information is iterative information, the controller 110 separately stores the iterative information at step 415, combines the separately-stored information, and converts the combined result into a data structure at step 415. However, if it is determined that the information is not the iterative information at step 413 or step 415 has been performed, the controller 110 determines whether information to be divisionally determined is provided at step 417. The category of data to be divisionally determined may be indicative of picture, multimedia, and character information, and so on. In this case, if the divisionally-determined data is established, backup transmission information is separately determined, and the determined result is combined at step 419. If the data to be divisionally determined is not established at step 417 or if the data is divisionally stored at step 419, the controller 110 transmits the processed backup information over the communication module 121 at step 421. Thereafter, the controller 110 determines whether the backup information transmission is finished at step 423. If it is determined that the backup information transmission is not finished at step 423, the controller 110 checks a connection state at step 425. If the connection state has been determined at step 425, the controller 110 returns to step 411 such that it performs a transmission preparation process of the next data. In this case, if a disconnection state is determined, the controller 110 detects the disconnection state at step 425, displays a transmission failure message at step 427, and returns to the previous step for backup information retransmission.

By repeating the aforementioned steps, the controller 110 transmits the determined backup information. The backup information is transmitted to the backup server 40 over the wireless communication network 20 and the Internet server 30. The backup server 40 stores backup information transferred from the mobile phone at step 229 (see FIG. 3). Thereafter, if the backup information has been stored, the backup server 40 generates a response message, and transmits the response message. The response message is transmitted to the mobile phone via the Internet server 30 and the wireless communication network 20. The mobile phone receives a response message from the backup server 40 at step 231.

In this case, a character structure of the data category "7" and a procedure for backup-transmitting the character will now be described in detail.

A character structure memory and a character image memory included in the memory 113 will hereinafter be described. The character may comprise an avatar, an avatar house, and items as described above. In this case, the avatar can perform a variety of functions, for example, an emotional state expression function, a content expression function of the SMS message, and an event expression function of the mobile phone. The avatar house is indicative of screen display data displayed on the display 140 in a standby mode of the mobile phone, and the items are indicative of characters displayed in the avatar house.

FIGS. 6A through 6J depict avatars, avatar houses, and items stored in a character memory in accordance with an embodiment of the present invention. FIGS. 7A through 8H depict examples of avatars, avatar houses, and items in accordance with an embodiment of the present invention.

The characteristics of the avatar, avatar house, and items according to the present invention will hereinafter be described with reference to FIGS. 7A through 8H.

Referring to an avatar expression method using FIGS. 7A through 7L, the inventive mobile phone can perform a variety of functions, for example, emotional states of the mobile phone, emotional expressions of the received SMS message contents, and event indication functions. In accordance with an embodiment of the present invention, a plurality of avatars for expressing seven emotions are shown in FIGS. 7A through 7G, and a plurality of avatars for expressing event notifications of the mobile phone are shown in FIGS. 7H through 7L.

Figure 8A:
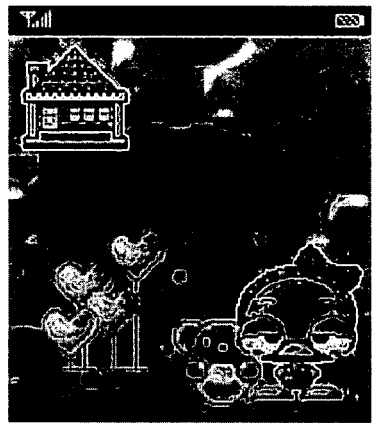
FIGS. 8A through 8H are exemplary avatar houses and item characters in accordance with an embodiment of the present invention.
Figure 8B:
Figure 8C:
Figure 8D:
Figure 8E:
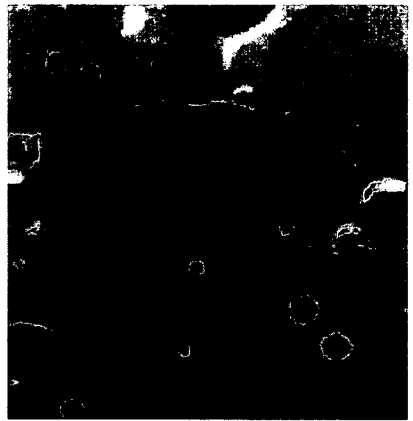
Figure 8F:
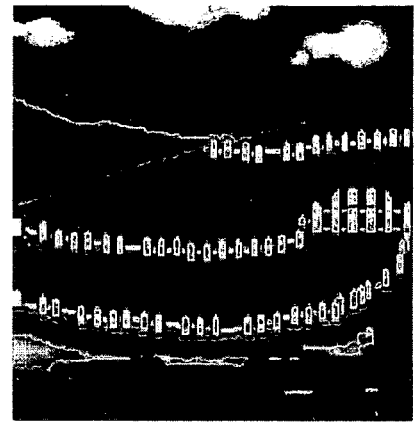
Figure 8G:
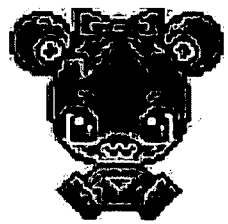
Figure 8H:
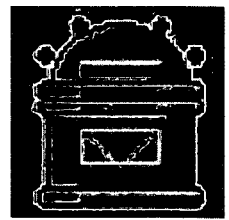

Avatar houses and items will be described with reference to FIGS. 8A through 8H. The avatar houses are indicative of screen images displayed in a standby mode of the mobile phone as shown in FIGS. 8A through 8D. Each avatar house comprises a background image and items. For example, FIG. 8A depicts the avatar house comprising the background image, the avatar, and items. FIGS. 8C through 8D depict examples of the avatar house comprising a background image and items. The background image of the avatar house is shown in FIG. 8E or 8F, and the items are shown in FIG. 8G or 8H. In this case, the user can freely design his or her desired avatar house. Specifically, the user of the mobile phone selects a background image of the avatar house shown in FIG. 8G or 8H, and selects desired items from among a plurality of items shown in FIGS. 8G through 8H. In this case, the avatar house is displayed as shown in FIG. 8C or 8D. The avatar may be included in the avatar house shown in FIG. 8C or 8D. In this case, the displayed avatar house is displayed as shown in FIG. 8A or 8B.

Figure 6D:
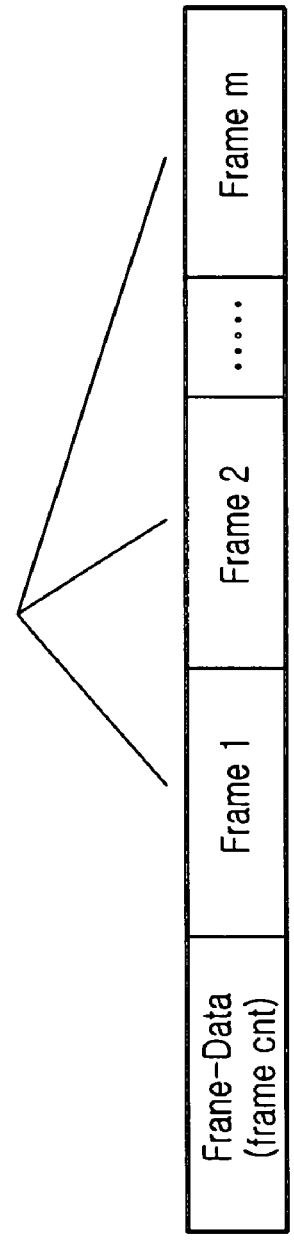

FIGS. 6A through 6J are detailed diagrams of the avatar, the avatar house, and the items in accordance with an embodiment of the present invention. The avatar, the avatar house, and the items are configured in the form of FIG. 6A. As shown in FIG. 6A, inventive characters such as avatar, avatar house, and items are configured in the form of a file using the structure of FIG. 6A, and are stored in the memory. In this case, the header is indicative of a total header of a corresponding character, and animation data is indicative of binary data in which frames constructing a corresponding animation are each compressed.

The avatar structure will first be described. FIGS. 6B through 6D are detailed diagrams of the avatar structure. Specifically, FIG. 6B depicts a total header configuration of the avatar structure, FIG. 6C depicts header fields associated with individual animations Ani 1 through Ani n of FIG. 6B, and FIG. 6D depicts a configuration of images associated with individual animations Ani 1 through Ani n. The avatar data file stored in the memory 113 includes an avatar animation structure and compressed image data for use in the avatar animation structure. The number of the aforementioned data files may be equal to a plural number.

FIG. 6B depicts a header structure of FIG. 6A when the character is equal to the avatar. In FIG. 6B, "type" is data indicative of a character format, and is indicated by an "ENUM" constant indicative of an avatar. "numAni" is data indicative of the number of following animations. If the number of emotion expression animations is "5", the number of SMS message expression animations is "5", and the number of event expression animations is "5", "numAni" is equal to "25". The sequential animations "Ani 1 through Ani n" are equal to data indicating individual animation structures. In the aforementioned case, the number of "Ani" data is equal to 25.

FIG. 6C depicts a header of individual "Ani" data of FIG. 6B, and defines fields of individual "Ani" data. "AniID" of FIG. 6C is equal to an animation Identification (ID), and "startIndex" is equal to an animation start offset, and is used as a file start position reference. "frameCnt" is equal to the number of frames of animation configuration images, "int X" is indicative of an X-axis of the display 140 on which animation data is to be displayed, "int y" is indicative of a Y-axis of the display 140, "int width" is indicative of a horizontal size of the animation, and "int height" is indicative of a vertical size of the animation. "byte name" records an avatar name in the first animation "Ani 1", and uses the second animation "Ani 2" as an emotion numerical value of the avatar.

FIG. 6D includes a plurality of fields equal to the number of animations "Ani 1 through Ani n" of FIG. 6C, and depicts a configuration of animation image data associated with individual animations "Ani". In FIG. 6D, "Frame_data" is indicative of a first header of animation data, and "startIndex" of the structure of FIG. 6C includes a start offset of frame data "Frame_data". "frame_data" is repeatedly stored a predetermined number of times equal to the number of frame counts "frameCnt" defined in an upper header by two member variables such as "unsigned long m_start" and "unsigned long m_length". In this case, "unsigned long m_start" is a variable indicative of a frame start offset, and "unsigned long m_length" is a variable indicative of a frame size (i.e., the number of compressed bytes). The frame shown in FIG. 6D is a storage area of the compressed frame data, and the number of frames is equal to the number of indications recorded in "frameCnt" of the header area shown in FIG. 6C.

The aforementioned avatar has the configuration shown in FIG. 6A. In this case, a header structure is equal to the configuration of FIG. 6B. Header structures of individual animations of FIG. 6B are shown in FIG. 6C, and their corresponding animations are shown in FIG. 6D. Therefore, if the avatar is able to express 12 animations shown in FIGS. 7A through 7L, the variable "n" of "Ani 1 through Ani n" is equal to 12, and the number of structures such as FIGS. 6C through 6D is equal to 12.

Individual structures of the avatar house and the items will be described. Referring to FIGS. 8A through 8D, the avatar house comprises a combination of a background image, an avatar, and items. In this case, the avatar house has the same configuration as FIG. 6A. The header structure of the avatar house has the same configuration as FIG. 6E. In this case, the avatar house stores only one compressed image, differently from the avatar, and must maintain information of items connected to the avatar house, such that the header of FIG. 6A is the same as FIG. 6E.

Referring to the header structure of the avatar house with reference to FIG. 6B, "type" is an "ENUM" constant indicative of the avatar house, "numAni" is the number of items (to be displayed in the avatar house as shown in FIGS. 8A through 8D) connected to the avatar house and the number such as the number of items+1 of background images of the avatar house. "Ani 1 through Ani n" are indicative of the number of items contained in the avatar house and the number of background images the number of items+1. In this case, "Ani 1" contained in the "Ani 1 through Ani n" is indicative of header information of the background image of the avatar house, and the remaining "Ani 2 through Ani n" is indicative of header information of items contained in the avatar house. FIG. 6F depicts header information of the background image of the avatar house. FIG. 6G depicts header information of items contained in the avatar house.

Referring to FIG. 6F, "ani ID" is indicative of a background image ID of the avatar house, "startIndex" is indicative of information of a start offset such as file start position reference of the background image, "frameCnt" is indicative of the number of image frames, and is equal to "1". "int x" is indicative of an X-axis at which the avatar is to be displayed, "int y" is indicative of a Y-axis at which the avatar is to be displayed, "int width" is indicative of a horizontal size of the avatar house background image, "int height" is indicative of a vertical size of the avatar house background image, and "byte name [MAX_HOUSE_NAME_LEN] is indicative of an avatar house name. As stated above, the avatar may be displayed in the avatar house. The displayed avatar is equal to an avatar for emotion expression, and may be equal to an avatar corresponding to an emotional state of a current mobile phone from among FIGS. 7A through 7G.

Figure 6E:
Figure 7A:
FIGS. 7A through 7L are exemplary avatar characters in accordance with an embodiment of the present invention.
Figure 7B:
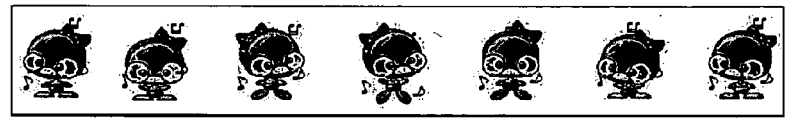
Figure 7C:
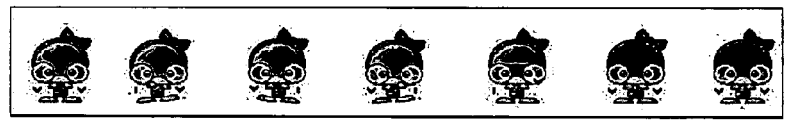
Figure 7D:
Figure 7E:
Figure 7F:
Figure 7G:
Figure 7H:
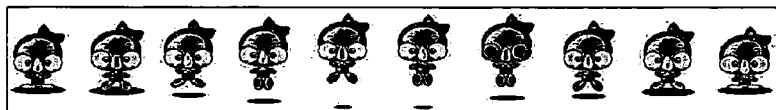
Figure 7I:
Figure 7J:
Figure 7K:
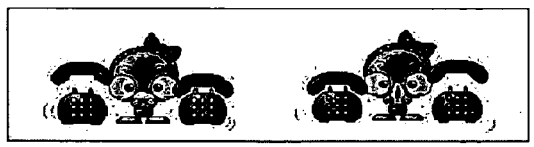
Figure 7L:

Referring to FIG. 6G, "aniID" is indicative of a connected item index. In this case, the index designation method for the item connected to the avatar house will be described with reference to FIGS. 6H through 6I. The item comprises only one image, such that "startIndex" and "frameCnt" are each equal to "0", "int x" is indicative of an X-axis position at which the item is to be displayed, "int y" is indicative of a Y-axis position at which the avatar is to be displayed, and "int width" and "int height" are each equal to "0". "byte name [MAX_HOUSE_NAME_LEN]" assumes a null state. Items connected to the avatar house are connected to "Ani 2 through Ani n" as shown in FIG. 6E. Each of "Ani 2 through Ani n" determines a position to be displayed in the avatar house as shown in FIG. 6G FIG. 6H depicts an item configuration. FIG. 6I depicts an item header configuration. Therefore, "type" of FIG. 6H is an "ENUM" constant indicative of an item, and "numAni" is determined to be "1" because the item comprises only one image. "Ani" is indicative of an item header, and is shown in FIG. 6I. "aniID" is indicative of item ID information, "startIndex" is indicative of information of a start offset such as file start position reference of the item image. "frameCnt" is indicative of the number of image frames, and is equal to "1". "int x" is equal to "0", "int y" is equal to "0", "int width" is indicative of a horizontal size of the item, "int height" is indicative of a vertical size of the item, and "byte name [MAX_HOUSE_NAME_LEN]" is indicative of an item name.

Therefore, the avatar house includes a background image, items connected to the background image, and position information, and each item includes item size information.

The aforementioned characters such as avatar, avatar house, and items, and so on uses an index variable, and the index variable basically uses a serial number of a file name stored in the memory 113 as an index value. The memory 113 stores only two index variables "g_avatar" and "g_avatar_house" in association with currently-selected avatar and avatar house. Specifically, the mobile phone may include two or more avatars, and may also include two or more avatar houses. In this case, the avatar and the avatar house each include structures shown in FIGS. 6A through 6H.

In this case, the index variable "g_avatar" is shown in FIG. 6J. The index variable "g_avatar" is indicative of a field for storing index variable information of the avatar selected by the current mobile phone. Referring to FIG. 6J, "emotion" is a field indicative of an emotion value of the current mobile phone, "CurFrame" is a field indicative of the number of currently displayed animation frames, "CurMotion" is a field indicative of currently-displayed behavior completion such as 0 or animation termination, and "index" is an index indicative of a real file or a Read Only Memory (ROM) area.

The field "index" of "g_avatar_house" is an index field indicative of a real file or ROM area in which an image is stored.

In case of a default avatar or a default avatar house, the field "index" is determined to be a negative(−) value. In the case of "g_avart.index=03", the currently-selected avatar is an avatar file corresponding to "avatar_03". In the case of "g_avartar_house.index=−2", the currently-selected avatar house is a second default avatar house.

The avatar, the avatar house, and the items each have a predetermined file structure as described above. Therefore, the controller 110 may transmit the avatar, avatar house, and items including the binary data to the backup server. In this case, header information of the character includes a binary data structure, and also includes image data corresponding to the header. In this case, if the automatic backup setup time is reached or if a manual backup process is requested, the controller 110 transmits the character file to the backup server 40. In this case, the character file transmitted to the backup server 40 transmits a current character file of the mobile phone without any change.

Figure 9:
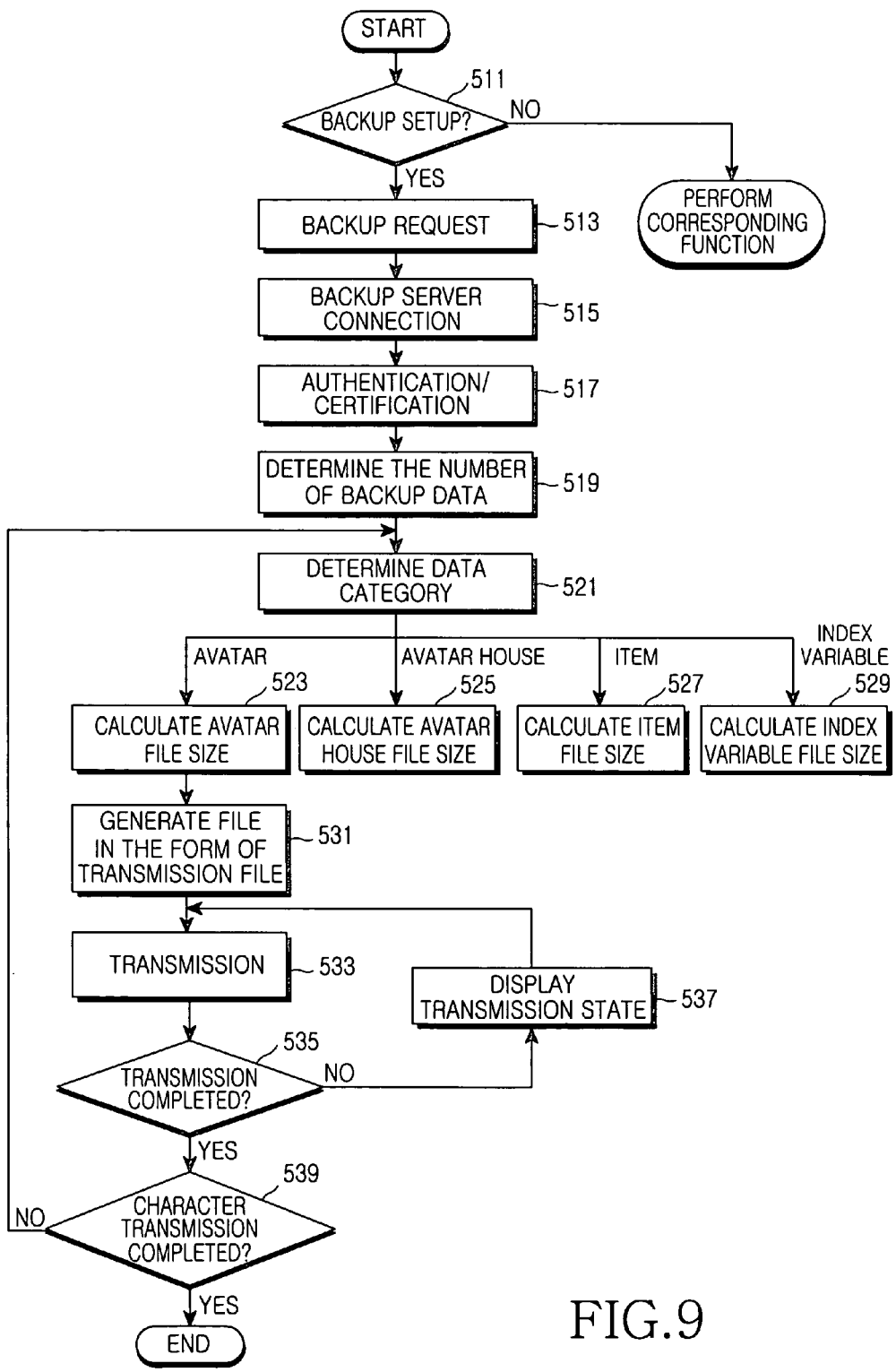
FIG. 9 is a flow chart illustrating a procedure for transmitting characters from a mobile terminal to a backup server in accordance with another embodiment of the present invention.

FIG. 9 is a flow chart illustrating a character backup transmission procedure in accordance with another embodiment of the present invention.

Referring to FIG. 9, if the automatic backup setup time is not reached or a manual backup process is not requested, the controller 110 performs a corresponding function at step 512. If the automatic backup setup time is reached or if a manual backup process is requested, the controller 110 detects the automatic backup setup time or the manual backup process at step 511, gains access to the backup server 40 by performing steps 513 and 515, and performs an authentication/certification procedure at step 517. The authentication/certification procedure is performed in the same manner as in FIG. 3. Thereafter, the controller 110 checks the number of backup character files at step 519. In this case, the character may be a single avatar file, one or more avatar houses, and one or more items. In this case, the avatar file in the character stored in the mobile phone comprises one or more avatar files or two or more avatar files. The avatar house file may comprise one or more avatar house files or two or more avatar house files. In this case, the item files may each comprise items connected to the avatar house and items not connected to the avatar house.

The user of the mobile phone can selectively backup his or her desired character during a manual backup setup process. In this case, the avatar, the avatar house, and/or the items can be selectively backup-processed. The user of the mobile phone can selectively backup only a currently-used avatar, or only avatars from among available characters can be selectively backup-processed.

After checking the number of backup characters at step 519, the data category to be currently backup-processed is checked at step 521. In this case, the data category may be determined to be an avatar, an avatar house, and an item or index variable. In an embodiment of the present invention it is assumed that the character backup process is performed in order of "avatar→avatar house→items→index variable".

If a backup character is determined to be an avatar at step 521, the controller 110 detects the backup character equal to the avatar, and calculates a size of an avatar file to be backup-transmitted at step 523. In this case, the avatar file has the same configuration as in FIG. 6A. The header structure has the same configuration as in FIG. 6B. Individual animation headers "Ani 1 through Ani n" shown in FIG. 6B have the same configuration as in FIG. 6C. The image file structures of the image data "Ani 1 through Ani n" have the same configuration as in FIG. 6D. Therefore, if the avatar file is determined, the controller 110 generates an avatar file having the same configuration as in FIGS. 6B through 6D in the form of a transmission file at step 531, and transmits the generated file in the order of FIG. 6A. If the avatar file is currently being transmitted at step 533, the controller 110 displays a transmission state of the transmitted avatar file on the display 140 at step 537. If the avatar file transmission is finished simultaneously with performing the aforementioned transmission procedure, the controller 110 detects the transmission of the avatar file at step 535, and determines whether all the character files have been completely transmitted at step 539.

In this case, if the character file transmission is not finished, the controller 110 detects the unfinished character file transmission at step 539, and returns to step 521, such that it checks the category of the next transmission character at step 521. If the character to be transmitted is determined to be an avatar file, the aforementioned operations are repeatedly performed.

However, if the character to be transmitted is determined to be an avatar house at step 521, the controller 110 calculates the size of an avatar house file to be transmitted at step 525. The file structure of the avatar house is equal to that of FIG. 6A. Specifically, the header in the avatar file structure of FIG. 6A has the same configuration as in FIG. 6E, "Ani 1" contained in FIG. 6E has the same configuration as in FIG. 6F, and the remaining structures of "Ani 2 through Ani n" have the same configuration as in FIG. 6G. In this case, FIG. 6F depicts header information of a background image of an avatar house, and FIG. 6G depicts header information of item files connected to the avatar house. "Ani 1 through Ani n" are equal to a background image of the avatar house and image files of the items, respectively. Therefore, if the backup transmission file is determined to be an avatar house file, the controller 110 generates a background image of the avatar house of FIG. 6G, header information of item files connected to the background image, and image files in the form of a transmission file at step 531, and transmits the generated transmission file in the order of FIG. 6A. If the avatar house file is currently being transmitted, the controller 110 displays a transmission state of the transmitted avatar house file on the display 140 at step 537. If the avatar house file transmission is finished while performing the aforementioned transmission procedures, the controller 110 detects the transmission completion of the avatar house file at step 535, and determines whether all the character files have been completely transmitted at step 539.

In this case, if the character file transmission is not finished, the controller 110 detects the unfinished character file transmission at step 539, and returns to step 521, such that it checks the category of the next transmission character at step 521. If the character to be transmitted is determined to be an avatar house file, the aforementioned operations are repeatedly performed.

However, if the character to be transmitted is determined to be an item at step 521, the controller 110 calculates the size of an item file to be transmitted at step 527. The item file includes a header and a single image structure. Specifically, the header in the item file structure of FIG. 6A has the same configuration as in FIG. 6H, and "Ani 1" has the same configuration as in FIG. 6I because an item has a single image in FIG. 6H. And, the animation includes only one image. Therefore, if the backup transmission file is determined to be an item file, the controller 110 generates header information of the item files of FIGS. 6H through 6I and image files in the form of a transmission file at step 531, and transmits the generated transmission file at step 533. If the item file is currently transmitted, the controller 110 displays a transmission state of the transmitted avatar house file on the display 140 at step 537. If the avatar house file transmission is finished while performing the aforementioned transmission procedures, the controller 110 transmits item files stored in the mobile phone simultaneously with performing the aforementioned procedure. Thereafter, if transmission of the items is finished, the controller 110 detects the transmission completion of the items at step 535, and determines whether all the character files have been completely transmitted at step 539.

In this case, if the character file transmission is not finished, the controller 110 detects the unfinished character file transmission at step 539, and returns to step 521, such that it checks the category of the next transmission character at step 521. If the character to be transmitted is a file associated with an index variable of the character, the controller 110 calculates avatar index variables of FIG. 6J and individual file sizes of the avatar index variables at step 529, and transmits the calculated result while performing the aforementioned procedures. In this case, the index variable of the avatar file includes an emotion value of the current mobile phone as shown in FIG. 6J.

If all the character files such as an avatar, an avatar house, an item, and index variable are completely transmitted, the controller 110 detects the transmission completion of all of the character files at step 539, and terminates the character backup procedure.

As apparent from the above description, the present invention can store a variety of resources stored in the mobile phone in a backup server over the Internet in a wireless communication system for performing character information communication between mobile phones.

Although certain embodiments of the present invention have been disclosed for illustrative purposes, those skilled in the art should appreciate that various modifications, additions and substitutions are possible, without departing from the scope and spirit of the invention as disclosed in the accompanying claims.

What is claimed is:

1. A method for controlling a mobile terminal to backup-store a character in a backup server over a wireless Internet, the backup server being capable of backing-up resource information of the mobile terminal including the character for performing an agent function by interacting with a terminal function, comprising the steps of:
 a) attempting to establish a connection to the backup server after transmission of a backup setup request;
 b) determining a category of avatar data of a character to be backup-stored after the connection to the backup server is established;
 c) when the determined category of the avatar data is avatar, calculating a file size of the avatar data, and generating a transmission file which comprises an avatar header including position information and size information of each of a plurality of individual animations included in the avatar data, and frame data of each of a plurality of images of images of each of the plurality of individual animations;
 d) when the determined category of the avatar data is avatar house displayed in a standby mode, calculating a file size of the avatar data, and generating a transmission file which comprises an avatar house header including position information of a background image included in the avatar data and position information of each of a plurality of items connected to the background image, image data of the background image, and image data of each of the plurality of items;
 e) transmitting the generated transmission file to the backup server; and
 f) terminating a backup operation if the backup server generates a response signal after transmitting the generated transmission file.

2. The method according to claim 1, wherein the avatar header information comprises an avatar format, the number of avatar animations, and header information of individual animations, and
 the header information of each animation comprises an animation ID, a start index, the number of animation images, indication positions, and image size fields.

3. The method according to claim 2, wherein the animation images each include a plurality of animation images indicative of emotional states of the mobile terminal, a plurality of animation images for expressing a variety of emotions corresponding to Short Message Service (SMS) message contents, and a plurality of animation images corresponding to events of the mobile terminal.

4. The method according to claim 1, wherein the avatar house header information comprises an avatar house format, the number of avatar animations contained in the avatar house, and animation header information of individual avatar houses,
 the animation header information comprises one background image animation header information and a plurality of item header information connected to the avatar house, and
 the background image animation header information comprises an animation ID, an indication position of the avatar displayed in the avatar house, and a plurality of image size fields, and each item header information comprises an item index and an indication position field of an item displayed in the avatar house.

5. A method for controlling a mobile terminal to backup-store a character in a backup server over a wireless Internet, the backup server capable of backing-up resource information of the mobile terminal including the character for performing an agent function by interacting with a terminal function, comprising the steps of:
 a) attempting to establish a connection to the backup server after transmission of a backup setup request;
 b) determining a category of avatar data of a character to be backup-stored after the connection to the backup server is established;
 c) when the determined category of the avatar data is avatar, calculating a file size of the avatar data, and generating a transmission file which comprises an avatar header including position information and size information of each of a plurality of individual animations included in the avatar data, and frame data of each of a plurality of images of each of the plurality of individual animations;
 d) when the determined category of the avatar data is avatar house displayed in a standby mode, calculating a file size of the avatar data, and generating a transmission file which comprises an avatar house header including position information of a background image included in the avatar data and position information of each of a plurality of items connected to the background image, image data of the background image, and image data of each of the plurality of items;
 e) when the determined category of the avatar data is item not connected to avatar house, calculating a file size of the avatar data, and generating a transmission file which comprises an item header including identification information and position information of each of a plurality of items included in the avatar data, and image data of each of the plurality of items;

f) transmitting the generated transmission file to the backup server; and g) terminating a backup operation if the backup server generates a response signal after transmitting the generated transmission file.

6. A method for controlling a mobile terminal to backup-store a character in a backup server over a wireless Internet, the backup server capable of backing-up resource information of the mobile terminal including the character for performing an agent function by interacting with a terminal function, comprising the steps of:

a) attempting to establish a connection to the backup server after transmission of a backup setup request;

b) determining a category of avatar data of a character to be backup-stored after the connection to the backup server is established;

c) when the determined category of the avatar data is avatar, calculating a file size of the avatar data, and generating a transmission file which comprises an avatar header including position information and size information of a plurality of individual animations included in the avatar data, and frame data of each of a plurality of images of each of the plurality of individual animations;

d) when the determined category of the avatar data is avatar house displayed in a standby mode, calculating a file size of the avatar data, and generating a transmission file which comprises an avatar house header including position information of a background image included in the avatar data and position information of each of a plurality of items connected to the background image, image data of the background image, and image data of each of the plurality of items;

e) when the determined category of the avatar data is item not connected to avatar house, calculating a file size of the avatar data, and generating a transmission file which comprises an item header including identification information and position information of a plurality of items included in the avatar data, and image data of each of the plurality of items;

f) when the determined category of the avatar data is index variable in association with a currently-selected avatar, calculating a file size of the avatar data, and generating, from the avatar data, a transmission file, which comprises a current emotion value of the currently selected avatar, an animation frame displayed in response to the current emotion value, a field indicative of a currently-displayed behavior corresponding to the currently-selected avatar, and a file index indicative of a transmission file corresponding to the currently-selected avatar;

g) transmitting the generated transmission file to the backup server; and h) terminating a backup operation if the backup server generates a response signal after transmitting the generated transmission file.

* * * * *